(No Model.) 2 Sheets—Sheet 1.
E. DÖRING & F. A. SIEGERT.
BICYCLE.
No. 424,864. Patented Apr. 1, 1890.
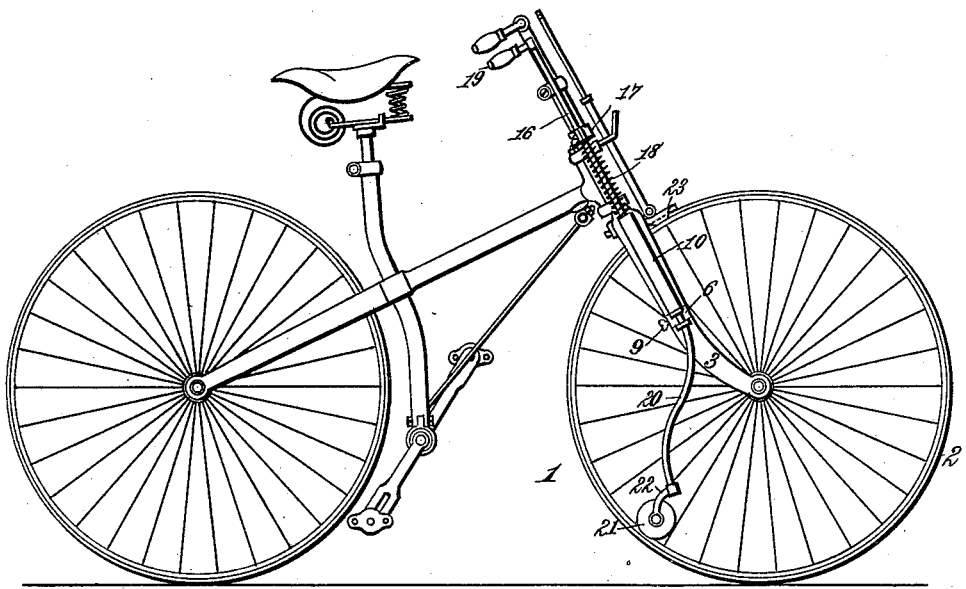
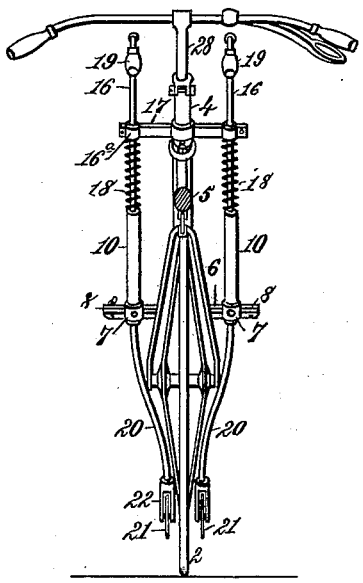
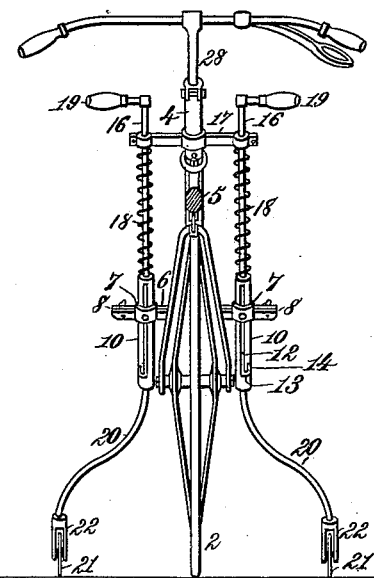
Witnesses:
Robert Everett
Geo. W. Rea
Inventor:
Emil Döring
Friedrich A. Siegert
By James L. Norris
Atty.

(No Model.) 2 Sheets—Sheet 2.
E. DÖRING & F. A. SIEGERT.
BICYCLE.
No. 424,864. Patented Apr. 1, 1890.
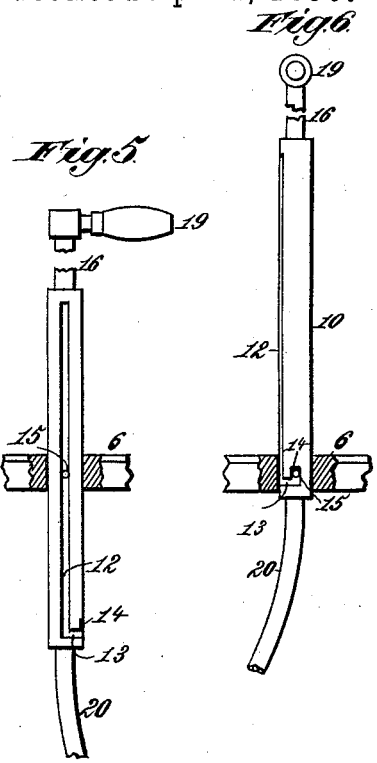
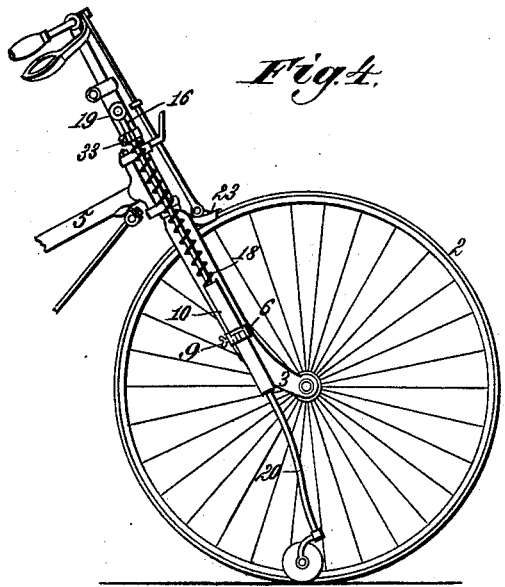
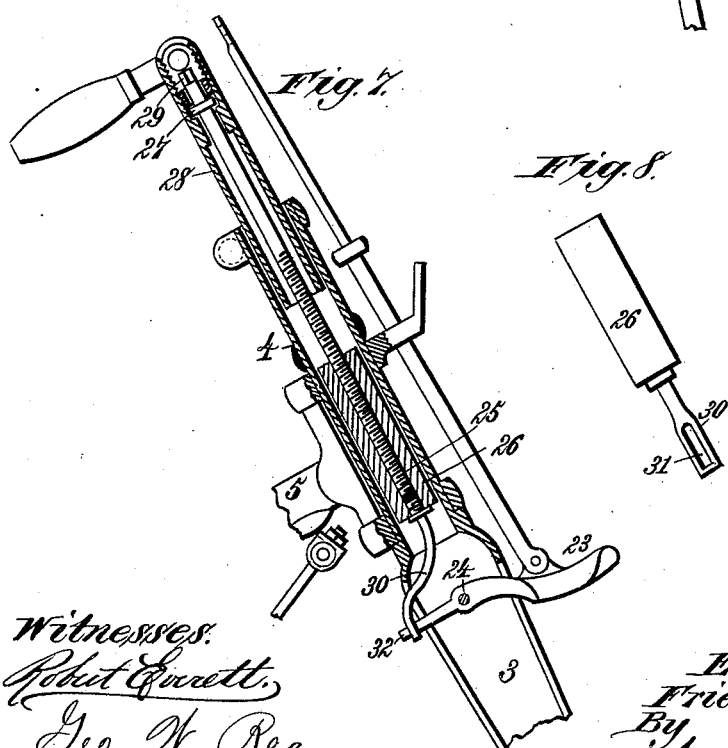
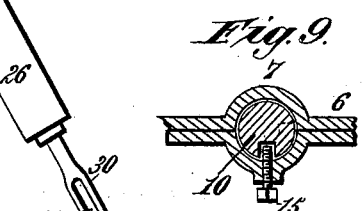
Witnesses:
Robt Garrett
Geo W Rea
Inventors:
Emil Döring
Friedrich A. Siegert
By James L. Norris
Atty.

UNITED STATES PATENT OFFICE.

EMIL DÖRING AND FRIEDRICH AUGUST SIEGERT, OF WEISTROPP, NEAR WILSDRUFF, SAXONY, GERMANY.

BICYCLE.

SPECIFICATION forming part of Letters Patent No. 424,864, dated April 1, 1890.

Application filed December 19, 1889. Serial No. 334,268. (No model.)

*To all whom it may concern:*

Be it known that we, EMIL DÖRING, engineer, and FRIEDRICH AUGUST SIEGERT, merchant, both of Weistropp, near Wilsdruff, citizens of Germany, residing at Weistropp, near Wilsdruff, in the Kingdom of Saxony, Germany, have invented certain new and useful Improvements in Bicycles; and we do hereby declare the following to be a full, clear, and exact description of the invention, such as will enable others skilled in the art to which it appertains to make and use the same.

Our invention relates to bicycles, and in some particulars it has special relation to that class of machines usually known as "Safety" bicycles. It is well known that, although this class of two-wheeled machines was introduced to remove the prejudice which many persons entertained regarding the dangers of falling in learning upon the Columbia and other high wheels, it is nevertheless the fact that very many are deterred from using the Safety machines because of the difficulties involved in learning to preserve their equilibrium, and especially in mounting.

It is the purpose of our invention to combine with a bicycle of this type simple means whereby the machine shall have as secure a poise as a three-wheeled machine or tricycle, and shall retain a perfectly stable equilibrium at all times when in motion or stationary. It is our purpose, also, to so construct said parts and combine them with the machine in such a manner that they may be brought into use at any moment by the rider and readily stowed or turned into a position where they shall offer no obstruction to the operation of the other parts. It is our purpose, also, to combine with these auxiliary supports means whereby they may travel smoothly upon any surface, surmounting ordinary projections and retaining contact with the ground in passing depressed places, and we also propose to furnish simple devices whereby said supports may be positively locked in either their working or in the non-acting position.

Our invention also contemplates the provision of novel means for locking the brake in contact with the wheel in such manner that an unauthorized person shall be unable to operate the driving-wheel.

The invention consists in the several novel features of construction and new combinations of parts hereinafter fully described, and then definitely pointed out in the claims following this specification.

To enable others to understand and practice our said invention, we will describe the same fully and in detail, reference being had to the accompanying drawings, in which—

Figure 1 is a side elevation of a machine embodying our invention. Fig. 2 is an elevation taken from the rear, showing the invention in non-acting position. Fig. 3 is a similar view showing the same parts extended and in operation. Fig. 4 is a side elevation of the forward end of the machine. Fig. 5 is a detail elevation, partly in section, showing the construction of the locking devices holding the auxiliary devices out of action. Fig. 6 is a similar view showing the parts in a different position. Fig. 7 is a sectional view of the tube-spindle and the parts constituting the brake. Fig. 8 is a detail view of one of the parts shown in Fig. 7. Fig. 9 is a detail view of the tubular spindle and its laterally-projecting arms.

In the said drawings, the reference-numeral 1 denotes a Safety machine of any usual form and construction, the forward or caster wheel 2 being journaled upon a bearing in a fork 3, which is provided with a tubular spindle 4, pivotally connected with the spine 5 or backbone. Upon the tubular spindle 4, at a point a little above the closed end of the fork 3, are rigidly attached two supports or arms 6, extending laterally on opposite sides of the spindle and parallel with the axis of the driving-wheel. Upon the ends of these supports are mounted collars 7, which are split or open, and the separable parts provided with lugs 8, through one of which is tapped a set-screw 9, by which the lugs may be forced together and the dimensions of the collar contracted. Arranged within each of these collars is a slide-bar 10, which may be of tubular form to lighten its construction and impart the necessary strength. Each of these slide-bars is provided with a longitudinal slot 12, terminating at its lower end in an imitation of a bayonet-slot, save that the short lateral extension 13 is provided with a short upwardly-turned slot 14, lying parallel with the longitudinal slot 12. A pin or screw 15, passing through one side of the collar 7, lies in the said slot, and prevents the revolution of the slide-bar upon its own axis, save as the pin 15 follows the lower portion 13 of the slot 12. By adjusting the set-screws 9 the collars may be contracted and caused to grasp the slide-bar with such force as to prevent its movement in either direction.

Upon the upper ends of the slide-bars 10 are mounted spindles 16, which lie within guiding sleeves or collars 16ª, formed or mounted upon a cross-head 17, supported by the upper portion of the tubular spindle 4. Upon the spindles 16 are coiled spiral springs 18, which are compressed between the ends of the slide-bars and the cross-head 17, their tension being exerted to throw the slide-bars downward until the pin 15 reaches the upper extremity of the slot 12 in each. A handle 19 is mounted upon the upper end of each spindle 16, said handle standing, when the pin 15 lies in the longitudinal slot 12, in the position shown in Fig. 3—that is to say, turned outwardly and substantially parallel with the axis of the driving-wheel.

Upon the lower ends of the slide-bars are attached arms 20, which in the position shown in Fig. 3 curve gently outward and then downward, their lower extremities being provided with caster-wheels 21, journaled in forked brackets 22, which are swiveled upon the arms 20, the wheels 21 running in rear of the ends of the arms 20, whereby they are enabled to follow or select their own course. When the handles 19 are turned outward to bring the pins 15 into the longitudinal slots 12 of the slide-bars, the latter will descend in the collars 7 until the wheels 21 rest upon the ground, as seen in Fig. 3, and if the roadway is level and smooth they may be clamped at the proper point by means of the set-screws 9. If the surface is rough, however, the operator should rely upon the handles 19, which are grasped by the hands, and a sufficient downward pressure exerted to balance the machine. When the lateral supports are no longer needed, the slide-bars are raised by means of the handles 19 until the pins 15 reach the bottoms of the longitudinal slots 12, when by turning the two handles into parallelism at right angles with the axis of the driving-wheel the pins 19 will traverse the short slots 13, and reaching the slots 14 will pass therein and be held there by the pressure of the springs 18. By this movement the caster-wheels 21 are raised from the ground, and the rotary movement caused by the pins 19 traversing the short transverse slots 13 swings the free ends of the arms 20 inward or toward each other, bringing them close to each side of the steering-wheel just within its rearward periphery. In this position they are held by the engagement of the pins 19 with the short slots 14.

The bicycle is provided with a brake-lever 23, fulcrumed upon a pin 24, and actuated in the usual manner by the devices ordinarily used upon bicycles of this and other types. Arranged within the tubular stem or spindle 4 is a screw-threaded rod 25, the thread of which meshes with a female thread cut in a sleeve 26, arranged and movable within the stem or spindle 4. Upon the upper end of the rod 25 is a collar or circumferential rib 27, which runs within a groove in a rigid sleeve 28, permitting the rod to have circular movement, but no other, said movement being imparted by a key or wrench applied through the open end of the tubular spindle to a squared end 29 of the rod. To the lower end of the movable sleeve 26 is attached an arm 30, in the end of which is formed a slot 31, through which passes the end 32 of an arm or extension of the brake-lever 23.

By the use of the key or wrench described the rod 25 is turned sufficiently to move the sleeve 26, raising the end 32 of the brake-lever and forcing the brake down upon the wheel with any required degree of force. The pressure of the brake can only be relieved by the use of a key similar to that by which the brake was locked. The operation of these parts does not in any manner interfere with the ordinary brake mechanism.

The collar 16ª on the cross-head 17 may be provided with clamping-screws 33, the collars being split like those upon the lower arms 6.

What we claim is—

1. The combination, with a bicycle, of a pair of vertically-movable and axially-rotatable slide-bars having their lower ends extended laterally and carrying wheels, and means for raising, lowering, and axially rotating the slide-bars, substantially as described.

2. The combination, with a bicycle having the spindle of the steering-wheel pivoted to the backbone and provided with collars, of a pair of wheel-carrying slide-bars movable vertically and axially rotatable independent of each other in the collars, a lever-handle for lowering, raising, and axially rotating each slide-bar, and devices engaging the slide-bars when raised and rotated for holding them in their uppermost positions, substantially as described.

3. The combination, with a bicycle, of a pair of vertically-movable and axially-rotatable wheel-carrying slide-bars, a pair of springs respectively engaging the slide-bars and acting to move them downward, lever-handles for raising and axially rotating the slide-bars, and devices for engaging the slide-bars when raised and rotated for holding them in their uppermost position against the tension of the springs, substantially as described.

4. The combination, with a bicycle having the spindle of its steering-wheel provided with collars, each having a pin, of a pair of wheel-carrying slide-bars vertically movable and axially rotatable in said collars, and having vertically and horizontally slotted portions which receive the pins of the collars, a pair of springs respectively engaging the slide-bars and acting to move them downward, and a lever-handle for raising and axially rotating each slide-bar, substantially as described.

5. In a bicycle, the combination, with the fork provided with laterally-projecting arms having screw-clamped sockets or collars, of slide-bars provided with longitudinal slots engaging the points of pins tapped through the sockets, spiral springs coiled upon spindles rising from the ends of the slide-bars and guided by collars on a cross-head on the fork-spindle, and arms mounted on the lower ends of said bars and having their outwardly-curved ends provided with caster-wheels swiveled thereon, the guiding-spindles being provided with handles, and the longitudinal slots in the slide-bars having short transverse or bayonet slots at the lower ends of the longitudinal slots communicating with short slots, locking the arms in folded position, substantially as described.

6. In a bicycle, the combination, with the tubular fork-spindle, of a screw-threaded rod swiveled therein and having a square head accessible to a key through the open end of the tubular spindle, and a longitudinally-movable sleeve having a female thread meshing with the threaded rod, said sleeve provided with an arm connecting with the end of the brake-lever, substantially as described.

7. In a bicycle, the combination, with a tubular fork-spindle, of a threaded rod swiveled therein and having a square head accessible to a key, a brake-lever, and a threaded sleeve lying in the tubular spindle and engaging the threaded rod, said sleeve having an arm projecting through a slot in the spindle and provided with a slotted end which engages the end or extension of the brake-lever which is fulcrumed in the fork, substantially as described.

In testimony whereof we affix our signatures in presence of two witnesses.

EMIL DÖRING.
FRIEDRICH AUGUST SIEGERT.

Witnesses:
CARL FR. REICHERT,
PAUL DRUCKMÜLLER.